United States Patent [19]

Becker

[11] E Re. 29,393

[45] Reissued Sept. 13, 1977

[54] APPARATUS FOR SEPARATING AND/OR COUNTING INDIVIDUAL ELEMENTS OF A PLURALITY

[75] Inventor: Reinhard Becker, Gieselwerder, Germany

[73] Assignee: Deere & Company, Moline, Ill.

[21] Appl. No.: 437,179

[22] Filed: Jan. 28, 1974

Related U.S. Patent Documents

Reissue of:

[64] Patent No.: 3,715,057
Issued: Feb. 6, 1973
Appl. No.: 206,282
Filed: Dec. 9, 1971

[30] Foreign Application Priority Data

Dec. 29, 1970 Germany ..... 2064336

[51] Int. Cl.[2] ..... A01C 7/04

[52] U.S. Cl. ..... 221/211; 111/77; 221/185

[58] Field of Search ..... 221/185, 211, 278, 160; 111/77; 214/1 BS

[56] References Cited

U.S. PATENT DOCUMENTS

| | | | |
|---|---|---|---|
| 3,387,746 | 6/1968 | Whipple | 221/211 |
| 3,533,535 | 10/1970 | Knapp | 221/211 |
| 3,542,242 | 11/1970 | Irvine | 221/211 |
| 3,548,765 | 12/1970 | Grataloup | 221/185 |

FOREIGN PATENT DOCUMENTS

| | | | |
|---|---|---|---|
| 160,049 | 1/1964 | U.S.S.R. | 221/278 |

*Primary Examiner*—Robert B. Reeves
*Assistant Examiner*—Frederick R. Handren

[57] ABSTRACT

Apparatus for separating and/or counting individual ones of a plurality of substantially similarly shaped particles, elements, grains, or the like, such as grains of seed, pills, etc., and including a hollow rotating drum, constructed to have plural, inwardly tapering indentations, terminating in a bore open to the interior of the drum and having at the bottom of the indentation dimensions smaller than the particles so that the particles cannot traverse the bore, the indentations being wider than the particles at the surface of the drum, the indentation dimensioned to hold at least one particle each. A nozzle directs an air jet towards the drum at direction and position so that the air strikes along the leading wall portion of the closest indentation as the drum rotates. Particles are fed towards the drum, so that at least one particle is in each indentation as it passes the jet.

29 Claims, 5 Drawing Figures

APPARATUS FOR SEPARATING AND/OR COUNTING INDIVIDUAL ELEMENTS OF A PLURALITY

Matter enclosed in heavy brackets [ ] appears in the original patent but forms no part of this reissue specification; matter printed in italics indicates the additions made by reissue.

The present invention relates to apparatus for separating and/or counting individual elements taken or to be taken from a quantity of approximately similarly shaped elements such as seed, pills, plastic particles or the like. More particularly, the invention relates to improvements in counting or separating apparatus which includes a housing, a bucket wheel or drum, journalled in the housing, a storage bin or the like and a feeder arrangement extending from bin to drum.

The separation and/or counting of at least approximately similarly shaped elements is an objective that may arise on various occasions and for a variety of reasons. So-called single seed sowing machines or pill dispensing or bottling apparatus, though quite unrelated have this objective in common; in both cases some kind of metering process for the individual elements is needed.

Sowing or seeding machines with single seed dispensing mechanism use a bucket wheel wherein the individual compartments are usually dimensioned so as to receive, possibly, only one seed grain. That seed is ejected upon continued turning of the wheel, and at a different location, if possible, into a prepared furrow. These machines pose the problem that each compartment should contain only one grain of seed, not two, and it should also not remain empty, otherwise growth retardation and/or a gap in the row of expected plants is inevitable.

In order to cope with that problem, it has been suggested to provide the bucket wheel with bores as cells or compartments for the individual seeds, and in the interior of the drum low pressure is maintained, so that the seed grains are sucked into the bores and maintained therein. Upon restoring normal pressure, the grains are free to drop from their respective compartments.

Such a machine operates quite satisfactorily, but it was found that in reality plural grains in one compartment or empty ones are not completely avoided, even if a mechanical stripper or wiper is used to remove excess protruding particles. Moreover, gauging of the seed is not avoidable with these machines, which is an expensive requirement. The crux of these machines lies in the attempt to match the compartment size to the grain size, but irregularities in shape and size make accurate single particle dispensing a matter of higher or lower probability.

The apparatus in accordance with the present invention avoids the several deficiencies and drawbacks as outlined above. In accordance with the preferred embodiment of the present invention, it is suggested to provide indentations in a drum which taper in inward direction, e.g., by having conical configuration. These indentations may be located either along periphery of the drum or on axial end faces thereof. The [apeces] *apexes* are not fully developed, i.e., the cones are actually [trunkated] *truncated.* The smallest diameter in each indentation is smaller than the diameter of the smallest particle or element to be separated.

The housing in which this drum is journalled is equipped with a blower having a nozzle that directs a jet towards the drum not quite tangentially to the wall of the indentation underneath, but at a slight angle particularly in relation to one portion of the inner wall of a tapering indentation. The apex angle of each cone should be from within the range from 40° to 90°, preferably about 45° to 60°. The drum itself is preferably exchangeably and displaceably disposed in housing journals.

As will be explained by way of a specific example (but having relevancy beyond that example) the conical indentations or bores are somewhat overdimensioned to receive at least one particle, element, grain etc. with certainty, but possibly more than one. Through aerodynamic effects, the jet will cause the one lowest particle in each bore to be sucked against the bottom wall portion of the bore, while the superfluous particles are flushed out.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Figure 1:
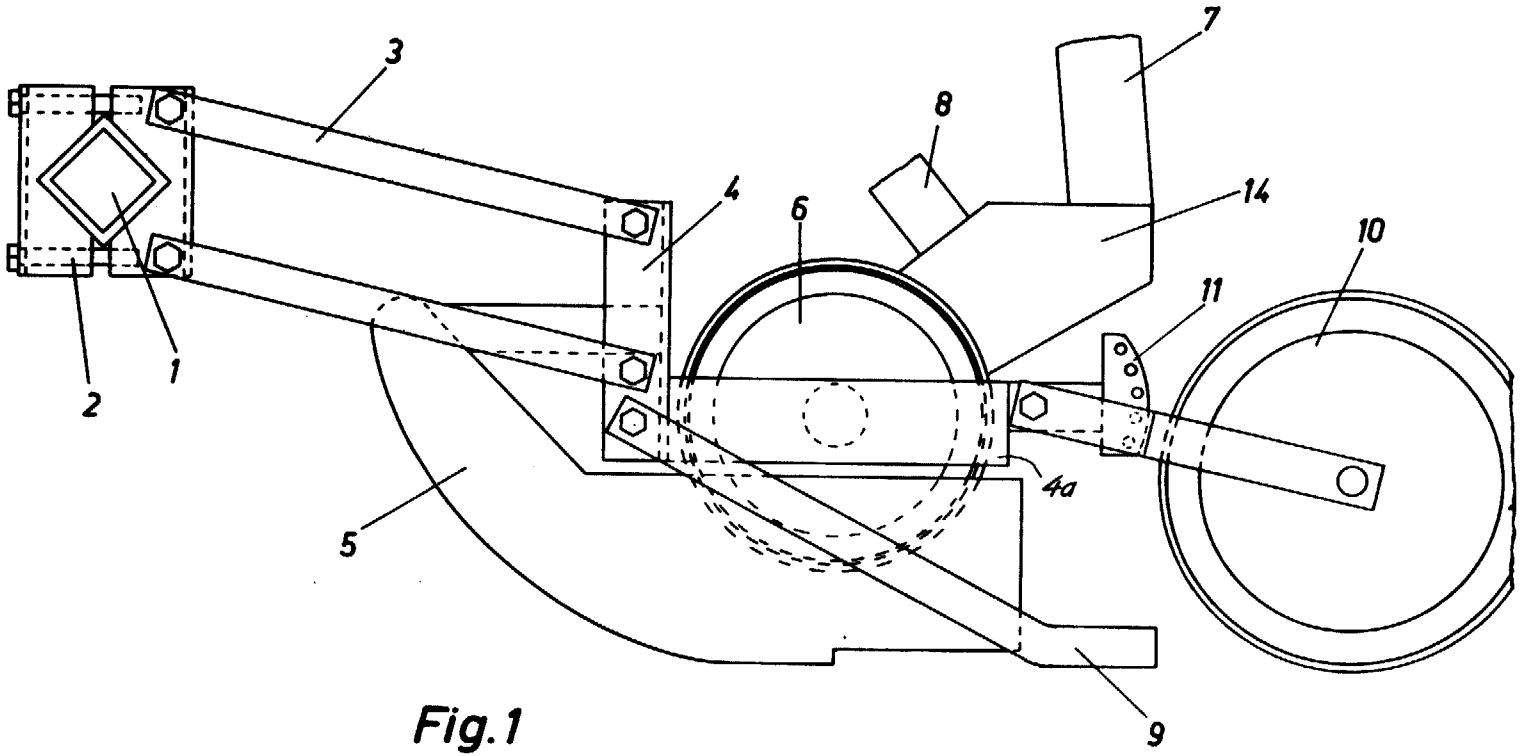
FIG. 1 is a side view of a seeder machine in which the invention can be practiced.

[Preceding] *Proceeding* now to the detailed description of the drawings, FIG. 1 illustrates a tubular carrier 1 that extends from a tractor. A clamp 2 is secured to carrier 1 as holder for a parallel construction and guide frame 3. The holder journals the two parallel arms [3a and 3b] and the fourth side is established by the frame 4 of the seeder machine, holding a seeder blade 5, a seeding apparatus proper 6 with feeder 7, and an air intake (outlet of a blower) 8. A stripper 9 and a roller 10 for closing the furrow are likewise connected to the frame part 4a. Roller 10 is [pivotable] *pivotably* linked to the frame as is known per se. Adjusting means 11 permit angular adjustment and elevation adjustment of the roller.

Figure 2:
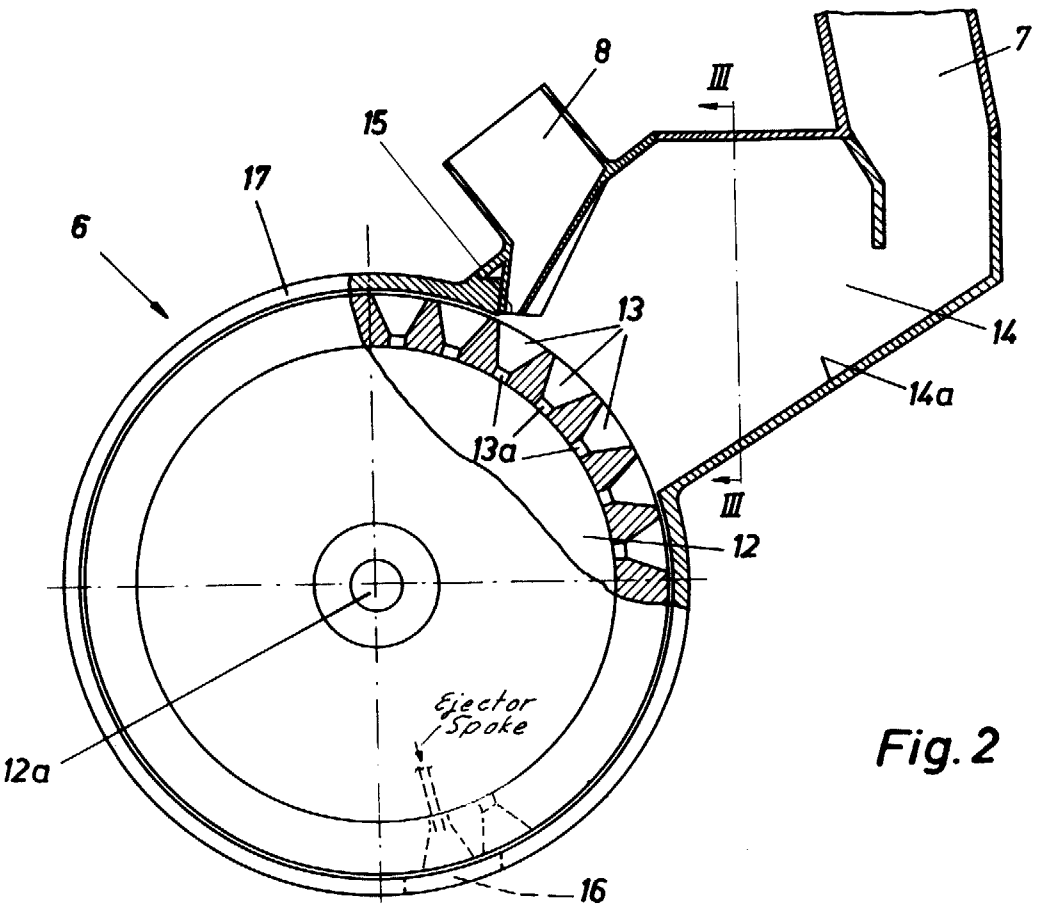
FIG. 2 illustrates side view, partially as section view, of an arrangement in accordance with the preferred embodiment of the invention, including incorporating feature for employment in a seeder machine.

After having described the background, I now turn to the improvement of this invention and here I refer to FIG. 2, showing relevant details. A bucket wheel or drum 12 is disposed, i.e., journalled in a housing 17 of the seeder apparatus 6. The drum 12 is driven in a manner known per se. A plurality of radially inwardly directed bores or indentations 13 of conical configuration, traverse the drum which is hollow in the interior. Actually, the conical indentations each merge with cylindrical bores 13a. Each bore or indentation 13, thus provides for a tapering container or compartment with perforated bottom.

Figure 4A:
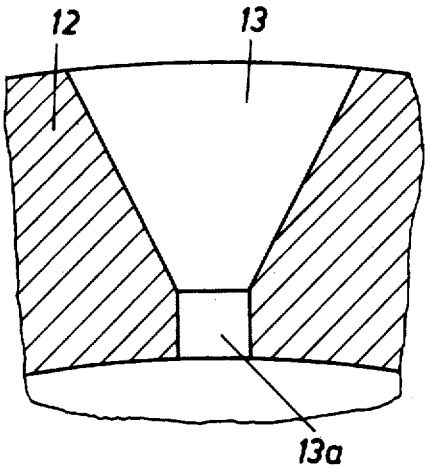
FIGS. 4 and 4a are respectively section view and top view into a bore that receives an element to be dispensed, counted, etc.
Figure 4B:
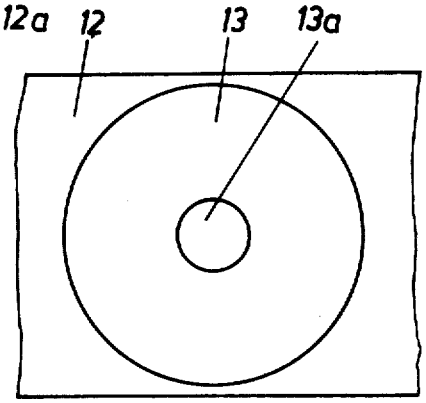

FIGS. 4a and 4b respectively show section and top view (radially inward) of such a bore.

The housing 17 of the feeder is constructed to accommodate a feeder chamber whose bottom 14a is inclined to the horizontal, so that grain (seeds) can slide down, and towards the drum 12. Grain enters chamber 14 through a chute or other suitable feeder input 7. The opening of the storage and feeder facility 14 towards the drum is selected to span about three indentations or bores 13, so that each will be filled with certainty with one or even several grains of seed. The volume of each conical bore is selected so that each can receive more than one grain.

Figure 3:
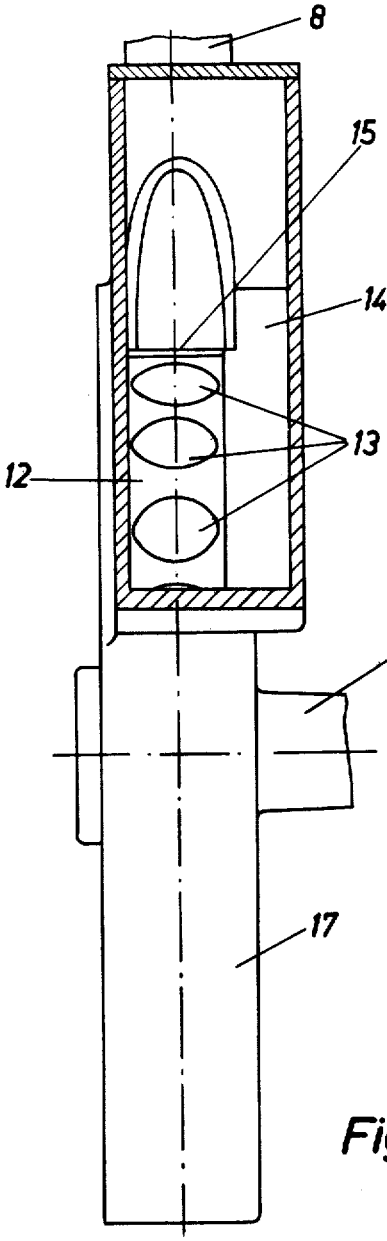
FIG. 3 shows section view along line III—III of FIG. 2.

A portion of the upper wall of chamber 14 is provided as air intake 8 terminating in a nozzle 15 of meniscus-like cross section (see FIG. 3). That nozzle is disposed in the immediate vicinity of the periphery of drum 12. The meniscus-shaped nozzle 15 has configuration that matches the contour of the upper (outer) edge or rim of each bore 13 (see FIG. 3), for a drum with a single peripheral row of bores. In particular, the nozzle has configuration so that the radius of curvature of the convex arc of the nozzle is approximately similar to the radius of curvature of the upper (outer) rim of the bore 13.

The wall of housing 17 encloses most of the drum 12 to retain the particles in the bores. The bottom has a seed ejection opening 16. It may be of advantage to provide a reciprocating ejector in the interior of the drum. The ejection may be positioned [excentrically] *eccentrically* in the drum but rotating therewith. The spokes may enter the bores 13a and 13 when in lower position to push the grains out of the bores. Care must be taken that a grain is not squeezed against the bottom wall of housing 17 before the compartment reaches opening 16 pursuant to the rotation.

Upon operation, the drum 12 rotates counterclockwise. Each bore 13a is filled with at least one, possibly more than one grain of seed. As a filled bore passes nozzle 15, the following transpires. The jet hits the leading wall of the particular conical bore 13 underneath as passing; the jet continues around the grain or grains through opening 13a towards the interior of the drum. As the cross section of the "duct" 13–13a reduces towards bore 13a, each bore actually accelerates the air jet. This acceleration is significant, even if a bore is empty. It is even more so when grains are in the respective bore, so that most of the air is actually deflected and returns along the trailing wall portion of bore 13, into the interior of feeder chamber 14.

It is assumed now that there is at least one, possibly two or more grains in such a blown at bore. The grain at the bottom, right next to the bottom bore 13a, is circumcirculated by air, particularly by the air that will continue through bore 13a. As a consequence, low pressure develops in bore 13a and sucks the grain against the lower taper and bottom of cone 13. All other elements in this bore 13 will be flushed out into bin 14. This will occur just before the particular bore is covered by the rim 17a of housing 17.

It can readily be seen that the flushing or blowing of superfluous grains from each bore has the advantage that they will not be damaged. The pressure used for blowing air into each bore passing nozzle 15 is selected in accordance with the approximately similar weight for the grain elements. Also, the size of the bore (which is determined by the size of the grain) and the estimated flow throttling resistance for air in a partially filled bore are parameters for the jet pressure. Actually, that pressure is simply adjusted experimentally, even on location. It will vary with the grain size.

As the air flow and, therefor, the low sucking pressure that develops in bore 13a and holds the bottom grain, acts only during passage of a bore under nozzle 15, no suction is effective thereafter, and the grain will readily drop out by gravity once the bore passes opening 16. Also, any air that has been blown into the drum will flow out again through the bore that registers with opening 16, aiding in the removal of the grain should it be stuck in the conical bore. That may occur if the cone is too pointed.

*Since pressurized air leaving the jet 8 will eventually find its way into the chamber 14 by way of the indentations 13, the chamber itself becomes pressurized. The feeder 7 will be filled with seed particles and the chamber 14 will be partially filled with the particles. Thus the chamber 14 is sufficiently closed to retain pressure therein. This is important since the bores or openings 13a passing adjacent the chamber 14 open internally of the drum. This helps the seed to enter into the indentations and to seat in the base of the indentations 13 prior to the air jet coming from the outlet 8 contacting the seed. It is therefore apparent that the pressurized air jet leaving the outlet 8 serves to eliminate all but one seed in the indentations 13 and also serves to pressurize the chamber 14 which forces the seed to seat properly at the base of the indentations 13 prior to the indentations passing under the outlet.*

Plural such arrangements in axially aligned relation can be provided for a single machine, the axial distance being the distance between adjacent furrows. This distance will essentially be adjusted by the clamping holders 2 as arranged on carrier tube, extending transverse to the furrows. The spacing between the individual grains of the seed along a furrow is essentially determined by the adjusted relation between the rotational speed of the drum 12 and the running speed of the tractor. The blower for feeding air towards nozzle 15 is likewise driven by the tractor.

If the seeder machine is used, for example, for sowing corn, it is not necessary to gauge or otherwise sort or classify the corn kernels, and still it is ensured that there will be one kernel (nor more, not less) in a bore 13.

It can readily be seen that the basic components can be used in substantially similar arrangements and even in similar configuration for counting or separating other types of particles. Possibly needed modifications may include a closing means for the ejection opening 16. After having a particular number of particles deposited into the compartments-indentations (which is determined by a particular angular displacement path or a number of revolutions of the drum), opening 16 is temporarily closed until the container underneath has been replaced by an empty one. In lieu of a compartmentized drum (bucket wheel) one can use a belt with compartments having configuration as outlined above. Only drive and feeder equipment have to be adapted accordingly.

The invention is not limited to the embodiments described above but all changes and modifications thereof not constituting departures from the spirit and scope of the invention are intended to be included.

I claim:

1. Apparatus for separating and counting individual ones of a plurality of substantially similar shaped particles, elements, grains, or the like, such as grains of seed, pills, etc., and including a rotating drum, feeder means for the particles and a housing for the drum, the improvement comprising:

the drum being hollow and [constructed to have plural] *having in its outer surface a plurality of* inwardly tapering indentations, *each indentation* terminating in a bore open to the interior of the drum and having at the bottom of the indentation dimensions smaller than the particles so that the particles cannot traverse the bore, the [indentations] *indentation* being wider than the particles at the surface of the drum, the indentation dimensioned to hold [at least] *therein more than* one particle each;

means including a nozzle for directing [an] *a defined* air jet towards the drum at direction and position so that the air jet is directed towards and into [an indentation] *successive indentations* striking along the leading wall [portion] *portions* thereof as the drum rotates; and the feeder means constructed to feed particles towards the drum, so that at least one particle is in each indentation as it passes the jet.

2. Apparatus as in claim 1, the indentations having conical configuration, the apex angle being between 40° and 90°.

3. Apparatus as in claim 2, the bore merging in the conical indentation being cylindrical.

4. Apparatus as in claim 2, the apex angle being 45° to 60°.

5. Apparatus as in claim 1, the drum disposed in a cylindrical housing covering the drum for [most] *part* of its circumference, the feeder means opening the housing along [the remaining] *another* part of the circumference, the nozzle arranged at the one end of the opening [where, in direction of rotation,] *so that* the drum surface enters *under the* cover [by] *of* the housing *after passing the jet.*

6. Apparatus as in claim 5, the opening providing to expose about three indentations to the feeder means.

7. Apparatus as in claim 5, the feeder means being arranged in the upper portion along the ascending path of the rotating drum, the housing having an outlet at the bottom.

[8. Apparatus as in claim 1, the nozzle having menixcus-like cross section.]

9. Apparatus as in claim 1, the drum including an ejector means.

*10. Apparatus for separating and counting individual ones of a plurality of substantially similar shaped particles, elements, grains, or the like, such as grains of seed, pills, etc., and including a rotating drum, feeder means for the particles and a housing for the drum, the improvement comprising: the drum being hollow and having a plurality of indentations extending inwardly from its outer surface, each of said indentations terminating in a bore open to the interior of the drum and having at the bottom of the indentation dimensions smaller than the particles so that the particles cannot traverse the bore, the indentations being wider than the particles at the surface of the drum, the indentations dimensioned to hold at least one particle each; means including a nozzle for directing a defined air jet towards the drum at direction and position so that the air jet is directed successively towards and into an indentation as the drum successively passes the indentations by the jet to blow particles in excess of one from the respective indentation while urging the remaining particle to seat in the indentation; and the feeder means constructed to feed particles towards the drum, so that at least one particle is in each indentation as it passes the jet.*

*11. Apparatus for separating and counting individual ones of a plurality of substantially similarly shaped particles comprising: a rotating drum having angularly spaced surface indentations, each indentation being sufficiently large to retain at least one particle therein and terminating in a bore opening to the atmosphere, the respective bores being smaller than the particles so that the particles cannot pass therethrough; means including a nozzle for directing a defined air jet successively into each indentation as the drum successively passes the indentations by said jet to blow particles in excess of one from the respective indentation while urging the remaining particle to seat in the indentation; means adjacent to the drum and for feeding particles into the indentations prior to their passing in the path of said jet; and retaining means next to the drum for retaining particles in the indentations after the indentations pass the air jet.*

*12. The invention defined in claim 11 in which each indentation is tapered from a large end larger than the particles to a small end at its respective bore.*

*13. The invention defined in claim 12 characterized by each indentation being of conical configuration which has its main axis on a radius of the drum.*

*14. The invention defined in claim 11 in which the indentations face outwardly and the bores open inwardly of the drum, the means for feeding particles into the indentation is a chamber holding said particles that is positioned on the upper side and is in communication with the drum, and is further positioned so that air from said jet is deflected from the indentations into the interior of the chamber.*

*15. A seed separating and individual counting apparatus comprising: a rotating seed conveying drum rotatable about a horizontal axis and having in its outer surface outwardly opening seed holding indentations terminating in bores smaller than the seeds opening internally of the drum; a seed chamber opening downwardly and in communication with the indentations; a seed discharge structure for receiving and discharging seeds from the indentations; a housing formed about the drum for retaining seeds in the indentations between the chamber and discharge structure; a single means for pressurizing the chamber including a nozzle for directing a defined jet of air successively into each of the indentations as the drum rotates for removing excess seed from each indentation and for urging a remaining single seed to seat in the respective indentation, and so that air leaving the nozzle moves first into the indentations and from there into the chamber.*

*16. A seed separating and individual counting apparatus comprising: a rotating seed conveying drum rotatable about a horizontal axis and having in its outer surface outwardly opening seed holding indentations terminating in bores smaller than the seeds opening internally of the drum, the dimensions of said indentations being such that each indentation may hold a plurality of seeds; a seed chamber opening downwardly and in communication with the indentations; a seed discharge structure for receiving and discharging seeds from the indentations; a housing formed about the drum for retaining seeds in the indentations between the chamber and discharge structure; and an air nozzle for moving pressurized air into the chamber and directing a defined jet of air successively at each indentation as the drum rotates so that air leaving the nozzle moves and blows back into the chamber all but one seed and urges the remaining one seed to seat in the respective indentation.*

*17. A seed separating and individual counting apparatus comprising: a rotating seed conveying drum having seed holding indentations formed on its outer surface; the indentations terminating in bores smaller than the seeds; a seed chamber in communication with the indentations and for depositing seed therein as the drum rotates; a seed*

*discharge structure for receiving and discharging seeds from the indentations; means cooperative with the drum for retaining seeds in the indentations between the chamber and discharge structure; and an air nozzle for moving pressurized air into the chamber and directing a defined jet of air successively at each indentation as the drum rotates so that air leaving the nozzle moves and blows back into the chamber all but one seed and urges the remaining one seed to seat in the respective indentation.*

*18. A seed separating and individual seed counting apparatus comprising: a moving seed conveying member having a surface and seed carrying indentations in the surface with bores at their bases; a seed chamber disposed alongside the member and having a discharge in simultaneous communication with a plurality of said indentations as said member moves the indentations through the chamber; and a pressurized air nozzle discharging into the chamber for pressurizing the latter and directing a defined air jet successively toward and into each of said plurality of said indentations as they pass the nozzle for blowing all but one seed from the respective indentation and urging said one seed to seat in said indentation at its bore immediately prior to the respective indentation leaving the chamber.*

*19. The invention defined in claim 18 in which said member is carried around an axis and said indentations lie in at least one row and as said member moves the row continuously traverses the discharge of said chamber and said indentations in the row consecutively receive seed from the discharge and consecutively pass through said jet.*

*20. The invention defined in claim 18 in which the indentations are tapered with the wide ends of the indentations opening to the discharge and the small ends of the indentations being at the bores.*

*21. The invention defined in claim 18 in which the indentations are tapered and as the member moves, it moves the indentations by the air jet so that the jet strikes the leading wall portion of each indentation.*

*22. The invention defined in claim 21 in which the moving member is a rotating drum with a peripheral row of indentations and said indentations pass successively through the discharge and by the air jet just prior to leaving the discharge of said chamber.*

*23. A seed separating apparatus comprising: a seed chamber opening downwardly at its base; a movable member closing at least a portion of the chamber base and having at least one row of surface indentations that pass under the chamber as the member moves and open upwardly to receive seeds from the chamber, said indentations having bores therein smaller than the seed for passing air through the indentations; and an air nozzle opening into the chamber for pressurizing the latter and directing a defined air jet toward and into successive indentations as they pass the nozzle and just prior to each respective indentation leaving the chamber for blowing excess seeds back into the chamber while urging a remaining single seed to seat in the respective indentation.*

*24. The invention defined in claim 23 further characterized by a cooperating surface member for retaining seeds in the respective indentations after they leave the chamber.*

*25. A seed separating apparatus comprising: a seed chamber opening downwardly at its base; a rotating member having at least one row of tapered surface indentations that pass under the chamber as the member rotates to receive seeds from the chamber, said indentations having bores therein smaller than the seed for passing air through the indentations; an air nozzle opening into the chamber for pressurizing the latter and directing a defined air jet toward and into successive indentations as they pass the nozzle and just prior to each respective indentation leaving the chamber for blowing excess seeds from the indentation back into the chamber while urging a remaining single seed to seat in the respective indentation; a housing formed about the rotating member for retaining seed in the indentations after leaving the chamber; and discharge means permitting discharge of the seeds from the indentations.*

*26. The invention defined in claim 25 in which there are a plurality of indentations in each row simultaneously within the chamber.*

*27. Apparatus for separating and counting individual ones of a plurality of substantially similar shaped particles, elements, grains, or the like, such as grains of seed, pills, etc., and including a rotating drum, feeder means for the particles and a housing for the drum, the improvement comprising: the drum being hollow and having in its outer surface a plurality of indentations, each indentation terminating in a bottom bore open to the interior of the drum and having at the bottom of the indentation dimensions smaller than the particles so that the particles cannot traverse the bore, the indentations being wider than the particles at the surface of the drum, each indentation dimensioned to hold a plurality of particles; means including a nozzle for directing a defined air jet towards the surface of the drum at direction and position so that the air jet is directed successively towards and into the respective indentations as the drum rotates; and the feeder means constructed to feed particles toward the outer surface of the drum so that normally a plurality of particles gravitate into each indentation prior to its passing the jet.*

*28. Apparatus for separating and counting individual ones of a plurality of substantially similarly shaped particles comprising: a rotating drum having angularly spaced surface indentations, each indentation being sufficiently large to retain a plurality of particles therein and terminating in a bore opening to the atmosphere, the respective bores being smaller than the particles so that the particles cannot pass therethrough; means including a nozzle for directing a defined air jet at each indentation as the drum successively passes the indentations by said jet; and means adjacent to the drum and for gravitationally feeding normally more than one particle into each indentation prior to its passing in the path of said jet.*

*29. A seed separating and individual counting apparatus comprising: a rotating seed conveying drum rotatable about a horizontal axis and having outwardly opening seed holding indentations, each being formed in its outer surface, each indentation being capable of holding a plurality of seed, said indentations terminating in bores opening internally of the drum, said bores being smaller than the seeds; a seed chamber opening downwardly to a top quarter-side portion of the drum and in communication with the indentations; a seed discharge structure for receiving and discharging seeds from the indentations; a housing formed about the drum for retaining seeds in the indentations between the chamber and discharge structure; means producing a defined air jet for moving pressurized air into the chamber and directed at and into successive indentations at a top portion of the drum as the drum rotates so that air leaving the jet moves first into the indentations and from there into the chamber; and means for rotating the drum so that the respective indentations are filled with seed from the chamber prior to their passing under the jet.*

*30. Apparatus for separating and counting individual ones of a plurality of substantially similar shaped particles, elements, grains, or the like, such as grains of seed, pills, etc., and including a rotating drum, feeder means for the particles and a housing for the drum, the improvement*

*comprising: the drum being hollow and having on its outer surface a plurality of inwardly tapering indentations, each indentation terminating in a bore open to the interior of the drum and having at the bottom of the indentation dimensions smaller than the particles so that the particles cannot traverse the bore, the indentations being wider than the particles at the surface of the drum, each indentation dimensioned to hold at least one particle each; means including a nozzle for directing a defined air jet towards the drum at direction and position so that the air jet is directed towards and into each successive indentation as the drum rotates and striking the respective indentation along the leading wall portion thereof as the drum rotates, said nozzle having a meniscus-like cross section; and the feeder means constructed to feed particles towards the drum, so that at least one particle is in each indentation as it passes the jet.*

* * * * *